(12) United States Patent
Ujii

(10) Patent No.: US 9,915,973 B2
(45) Date of Patent: Mar. 13, 2018

(54) UNIT FRAME FOR TOUCH PANEL AND TOUCH PANEL UNIT

(75) Inventor: Junichi Ujii, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 39 days.

(21) Appl. No.: 13/814,921

(22) PCT Filed: Jul. 14, 2011

(86) PCT No.: PCT/JP2011/004032
§ 371 (c)(1),
(2), (4) Date: Feb. 7, 2013

(87) PCT Pub. No.: WO2012/020541
PCT Pub. Date: Feb. 16, 2012

(65) Prior Publication Data
US 2013/0162581 A1 Jun. 27, 2013

(30) Foreign Application Priority Data

Aug. 11, 2010 (JP) ................................. 2010-180547

(51) Int. Cl.
| G06F 1/16 | (2006.01) |
| G06F 3/041 | (2006.01) |
| G06F 3/01 | (2006.01) |

(52) U.S. Cl.
CPC ............ *G06F 1/1607* (2013.01); *G06F 3/016* (2013.01); *G06F 3/041* (2013.01); *G06F 3/0414* (2013.01)

(58) Field of Classification Search
CPC ........ G06F 1/1607; G06F 3/016; G06F 3/041; G06F 3/0414; G02F 1/133308; G02F 2001/133628
See application file for complete search history.

(56) References Cited

U.S. PATENT DOCUMENTS 7,825,778 B2    11/2010  Nishimura et al.
8,184,228 B2 *   5/2012  Han et al. ...................... 349/58
(Continued)

FOREIGN PATENT DOCUMENTS

JP    2006-195734 A    7/2006
JP    2006-215776 A    8/2006
(Continued)

OTHER PUBLICATIONS

International Search Report; PCT/JP2011/004032; dated Oct. 25, 2011.

*Primary Examiner* — Richard Hong
(74) *Attorney, Agent, or Firm* — Studebaker & Brackett PC

(57) ABSTRACT

A unit frame 10 for touch panel for supporting a touch sensor and a display panel, both of which are in the rectangular shape, with a predetermined space therebetween, includes a frame body 11 in the rectangular shape, a support member 12, having a height corresponding to the predetermined space and provided at each corner of the frame body 11, configured to support each corner of a rear face of the touch sensor, and a holding member 13, provided at each corner of the frame body 11 on an opposite face to a face where the support member 12 supports the touch sensor, configured to clip the display panel in cooperation with the support member 12 corresponding to the holding member 13.

5 Claims, 6 Drawing Sheets

(56) References Cited

U.S. PATENT DOCUMENTS

| | | | | |
|---|---|---|---|---|
| 2003/0017856 A1* | 1/2003 | Kotchick | .......... | G02F 1/133528 |
| | | | | 455/566 |
| 2006/0087804 A1* | 4/2006 | Tsukamoto | ....... | G02F 1/133308 |
| | | | | 361/679.22 |
| 2006/0109254 A1* | 5/2006 | Akieda | .................... | G06F 3/016 |
| | | | | 345/173 |
| 2006/0126362 A1* | 6/2006 | Hsieh et al. | .................. | 362/633 |
| 2006/0192657 A1* | 8/2006 | Nishimura | .............. | G06F 3/016 |
| | | | | 340/407.2 |
| 2008/0143918 A1 | 6/2008 | Kim | | |
| 2009/0267902 A1* | 10/2009 | Nambu et al. | ................ | 345/173 |
| 2010/0127140 A1* | 5/2010 | Smith | ........................ | 248/220.1 |
| 2011/0001712 A1* | 1/2011 | Saito | ............................ | 345/173 |

FOREIGN PATENT DOCUMENTS

| | | |
|---|---|---|
| JP | 2010-044499 A | 2/2010 |
| JP | 2010-146507 A | 7/2010 |

\* cited by examiner

UNIT FRAME FOR TOUCH PANEL AND TOUCH PANEL UNIT

CROSS REFERENCE TO RELATED APPLICATION

This application claims priority to and the benefit of Japanese Patent Application No. 2010-180547 filed on Aug. 11, 2010, the entire contents of which are incorporated herein by reference.

TECHNICAL FIELD

The embodiment discussed herein relates to a unit frame for touch panel and a touch panel unit having the unit frame.

BACKGROUND

In recent years, a touch panel has been popularly used, as an input apparatus of an operation unit for receiving an input operation by an operator, in mobile terminals such as mobile phones and gaming machines; information equipment such as calculators and ticket vending machines; home electric appliances such as microwaves, TV sets and lighting equipment; industrial equipment (FA equipment) and the like. The touch panel is generally configured by a touch sensor and a display panel such as an LCD (Liquid Crystal Display) panel or an EL (Electroluminescence Display) panel having the touch sensor disposed thereon.

There are known a variety of types of the touch sensors, such as a resistive film type, a capacitive type, an optical type and the like. However, the touch sensors of these types receives a touch input (the input operation) by a pressing means such as a finger or a stylus pen and, unlike push-button switches, the touch sensors themselves are not physically displaced when being touched. Therefore, the operator may not be able to obtain feedback to the input operation, which causes a concern that an operator is likely to perform erroneous inputs.

In order to solve such a problem, the applicant has developed a touch panel that detects an input applying a predetermined pressing load on the touch sensor and vibrates the touch sensor in response thereto such that a tactile sensation is provided to the operator (for example, see Patent Document 1).

PATENT DOCUMENT

Patent Document 1: Japanese Patent Laid-Open No. 2010-146507

SUMMARY

According to the touch panel disclosed in Patent Document 1 set forth above, when the operator carries out the input operation applying the predetermined pressing load on the touch sensor, the touch sensor is vibrated and thus the tactile sensation is provided. Thereby, the operator may unfailingly recognize a reception of the input, which may prevent erroneous inputs.

According to a study by the present inventor, however, the touch panel described above needs to be improved as described below. That is, in assembling the touch panel described above, it is assumed that, at first, a piezoelectric element in the strip shape is adhered to a rear face of the touch sensor in the rectangular shape, and, then the touch sensor is fixed to a display panel in the rectangular shape via an insulator at each of four corners of the touch sensor. Thereby, the touch sensor may be held on the display panel such that the piezoelectric element may vibrate without touching the display panel. In this case, however, the number of components such as the insulators is increased, which is troublesome in assembling and deteriorates productivity. Such a problem occurs also when, without providing the piezoelectric element on the rear face of the touch sensor, the touch sensor is held above the display panel with a predetermined space therebetween.

Accordingly, in consideration of such a problem, a unit frame and the touch panel unit having the unit frame are provided, that enable to reduce the number of components of the touch panel and to simplify assembling, thereby improving productivity of the touch panel.

In order to achieve the above matter, a unit frame for touch panel according to one aspect configured to support a touch sensor and a display panel, both of which are rectangular in shape, with a predetermined space therebetween, includes:

a frame body in the rectangular shape;

a support member having a height corresponding to the predetermined space and provided at each corner of the frame body, configured to support each corner of a rear face of the touch sensor; and a holding member provided at each corner of the frame body on an opposite side to the face where the touch sensor is supported by the support member, configured to clip a corner of the display panel in cooperation with the support member corresponding thereto.

As a second aspect, the unit frame for touch panel according to the first aspect, further includes:

an edge member covering a periphery of a surface of the touch sensor; and an opening formed on a side wall of the frame body for allowing a flexible circuit board connected to the touch sensor to pass therethrough.

As a third aspect, the unit frame for touch panel according to the second aspect, further includes:

a guide portion formed on an external wall of the frame body from the opening along an end face of the frame body having the holding member, configured to guide the flexible circuit board; and grooves provided to the guide portion configured to support both edges of the flexible circuit board.

In addition, in order to achieve the above object, a touch panel unit according to a fourth aspect including the unit frame for touch panel, the touch sensor in the rectangular shape and the display panel in the rectangular shape according to the first aspect, wherein the touch sensor is disposed having corners on a rear face thereof supported on the support members provided each corner of the frame body, and the display panel is disposed having corners clipped by the support member on a face thereof opposite to a face supporting the touch sensor and by the holding member corresponding to the support member.

As a fifth aspect, the touch panel unit according to the fourth aspect, further includes a piezoelectric element mounted on each of two opposing peripheries of the rear face of the touch sensor.

An embodiment below describes a support member for supporting the touch sensor and a holding member for clipping the display panel in cooperation with the support member are provided to the frame body of the unit frame. Thereby, the number of components of the touch panel may be reduced and assembling is simplified, thus improving productivity of the touch panel.

DESCRIPTION OF EMBODIMENT

An embodiment will be described with reference to the accompanying drawings.

Figure 1:
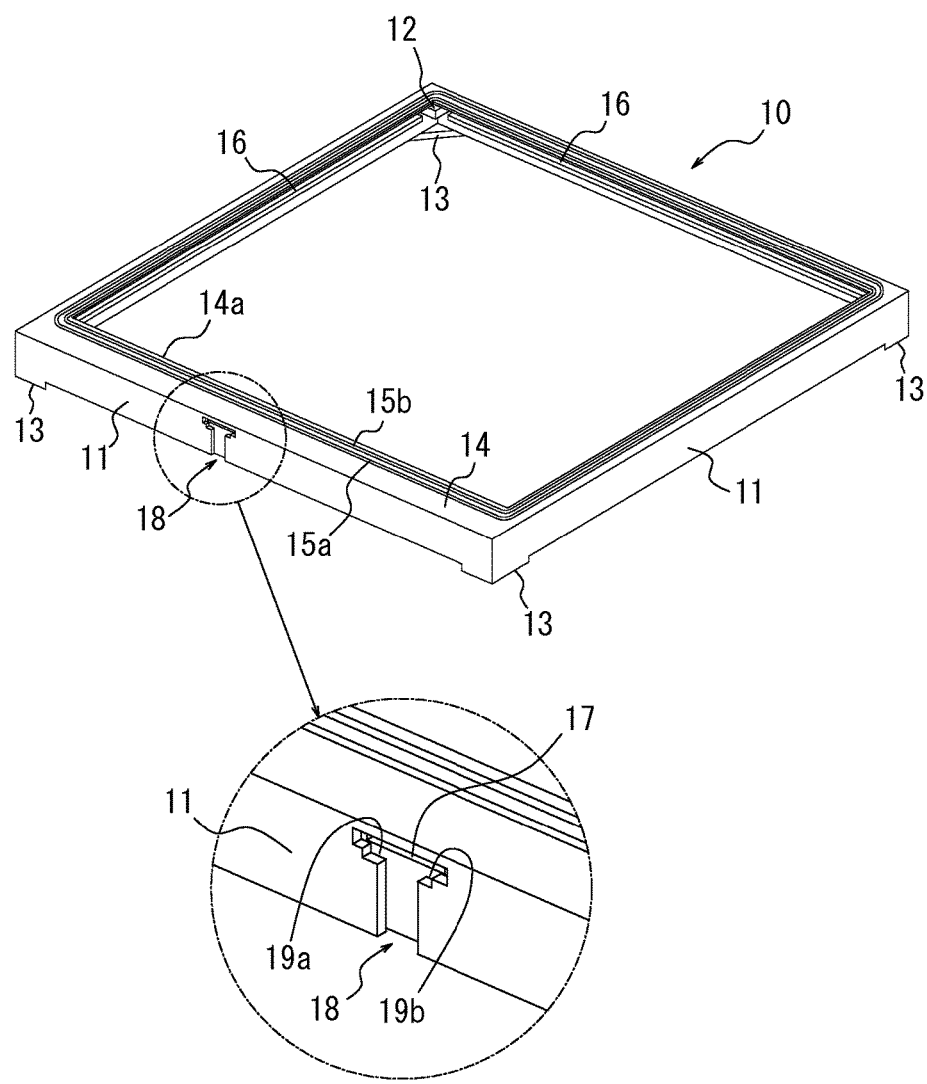
FIG. 1 is an external perspective view of a front side of a unit frame for touch panel according to one embodiment.
Figure 2:
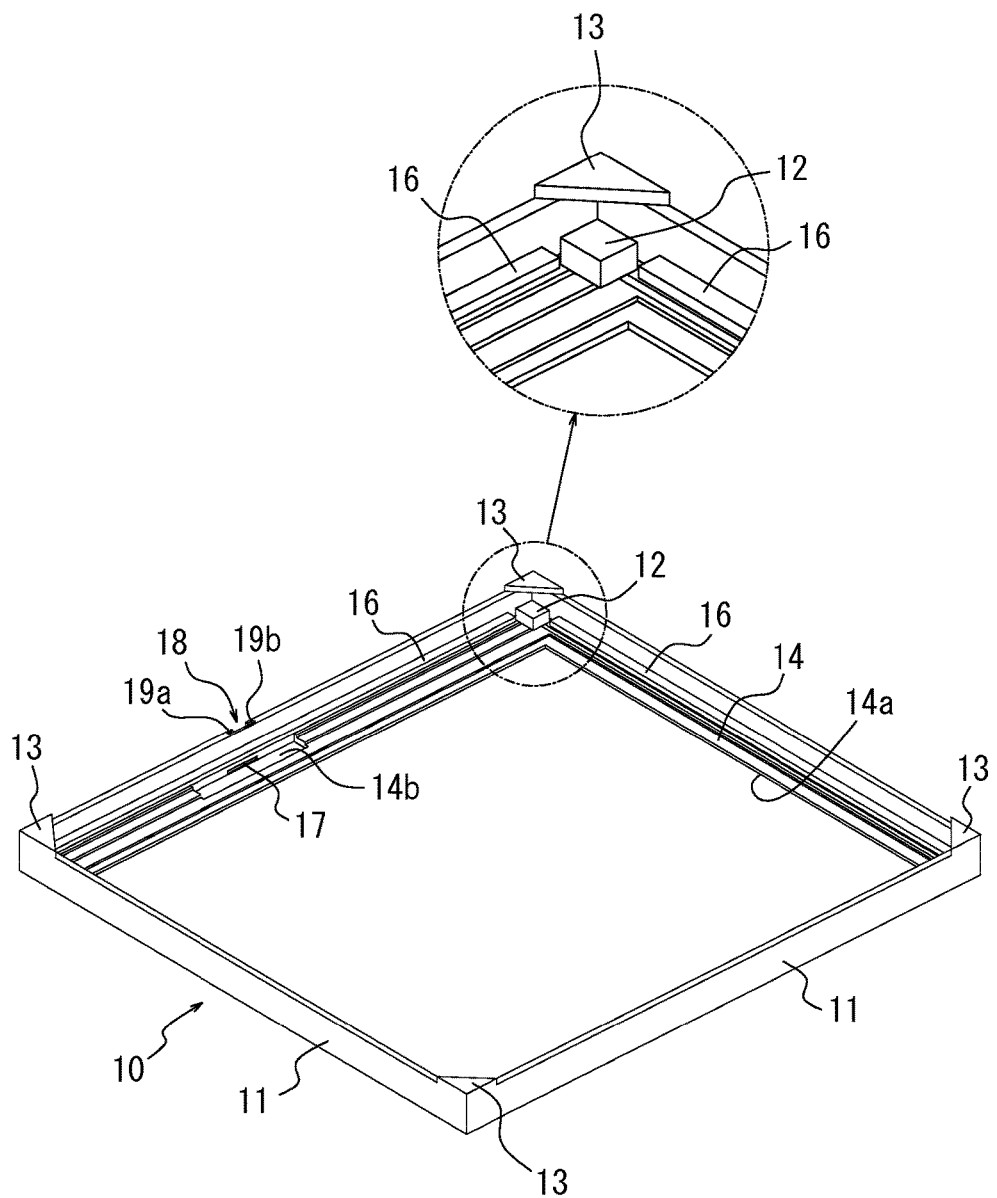
FIG. 2 is an external perspective view of a rear side of the unit frame for touch panel according to one embodiment.

FIG. 1 is an external perspective view of a front side of a unit frame for touch panel according to the embodiment of the present invention, and FIG. 2 is an external perspective view of a rear side of the same. A unit frame 10 for touch panel supports a touch sensor and a display panel, both of which are in the rectangular shape, with a predetermined space therebetween and includes a frame body 11 in the rectangular shape. The frame body 11, at each corner inside thereof, is provided with a support member 12 for supporting each corner of a rear face of the touch sensor. The support member 12 is formed to be flat on a front face and a rear face thereof and has a height corresponding to the predetermined space for supporting the touch sensor and the display panel. Each of the support members 12 may be, for example, a square column, 3 mm on one side of each of a front face and a rear face and 2 mm in height.

The frame body 11, in a manner corresponding to each of the support members 12, is provided with a holding member 13 for clipping a corner of the display panel in cooperation with a corresponding support member 12 on a face opposite to the face where the support member 12 supports the touch sensor, that is, on a rear face. Although each of the holding members 13 is provided at a corner of the rear face of the frame body 11 in FIG. 1 and FIG. 2, each of the holding members 13 may be provided inside the frame body 11.

The frame body 11, on a front face thereof, is provided with an edge member 14 for covering a periphery of a front face of the touch sensor. The edge member 14 forms a frame opening 14a corresponding to a display area of the display panel. The edge member 14 has two protruding members 15a, 15b stretching along an entire surface thereof. The protruding members 15a, 15b have top portions that contact inside a bezel of a case of an applicable apparatus when the touch panel unit having the unit frame 10 for touch panel is mounted on the applicable apparatus. Since only the top portions of the protruding members 15a, 15b contact the inside of the bezel, blocking vibration of the touch sensor may be reduced and foreign substances may be prevented from entering between the bezel and the edge member 14.

Further, an inner wall on each side of the frame body 11, as illustrated in a partially enlarged diagram in FIG. 2, has a rail member 16 on the level of a rear face of the support member 12. The rail member 16 on each side is formed to have a narrower width than the edge member 14 and lower than each support member 12. For example, when the support member 12 is 3 mm wide and 2 mm high, the width and the height of the rail member 16 may be half of them; 1.5 mm and 1 mm, respectively. Although the rail member 16 on each side is provided separately from the support member 12 adjacent thereto in FIG. 2, the rail member 16 may connect to the support member 12 adjacent thereto.

One side (side wall) of the frame body 11 has an opening 17 for allowing a flexible circuit board connected to the touch sensor mounted on the frame body 11 to pass therethrough. Also, at a position close to the opening 17 on a rear face of the edge member 14, a cutout 14b is formed to avoid interfering with resin provided to the flexible circuit board for connection protection. The cutout 14b enables to prevent interference with the connection protecting resin of the flexible circuit board.

Further, as illustrated in a partially enlarged diagram in FIG. 1, a guide portion 18 for guiding the flexible circuit board is formed from the opening 17 to the end face of the frame body 11 having the holding member 13 on an outer wall of the frame body 11 having the opening 17 formed thereon. The guide portion 18 is formed concave on the outer wall of the frame body 11 and, on both sides of a height direction, has grooves 19a, 19b for supporting both edges of the flexible circuit board. The flexible circuit board 24, which will be described below, is guided into the grooves 19a, 19b of the guide portion 18 and thus disposed inside the frame body 11, which enables to buffer a shock and the like to the flexible circuit board 24 from outside.

The unit frame 10 for touch panel formed as described above is integrally molded with plastic, for example.

Next, the touch panel unit having the unit frame 10 for touch panel unit illustrated in FIG. 1 and FIG. 2 will be described with reference to FIG. 3 to FIG. 6.

Figure 3:
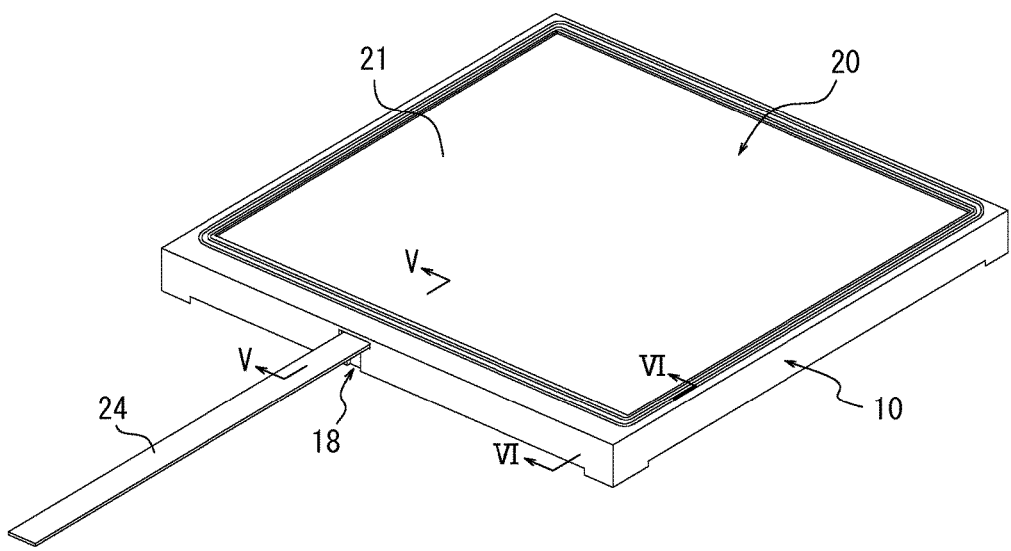
FIG. 3 is an external perspective view of a touch panel unit having the unit frame for touch panel illustrated in FIG. 1.
Figure 4:
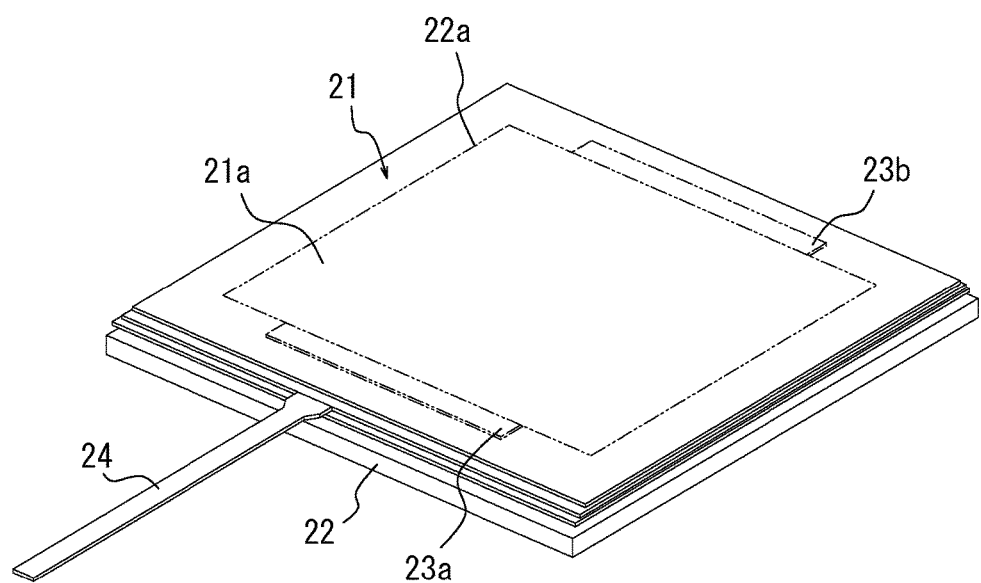
FIG. 4 is an external perspective view of a touch sensor and a display panel together constituting the touch panel unit illustrated in FIG. 3.
Figure 5:
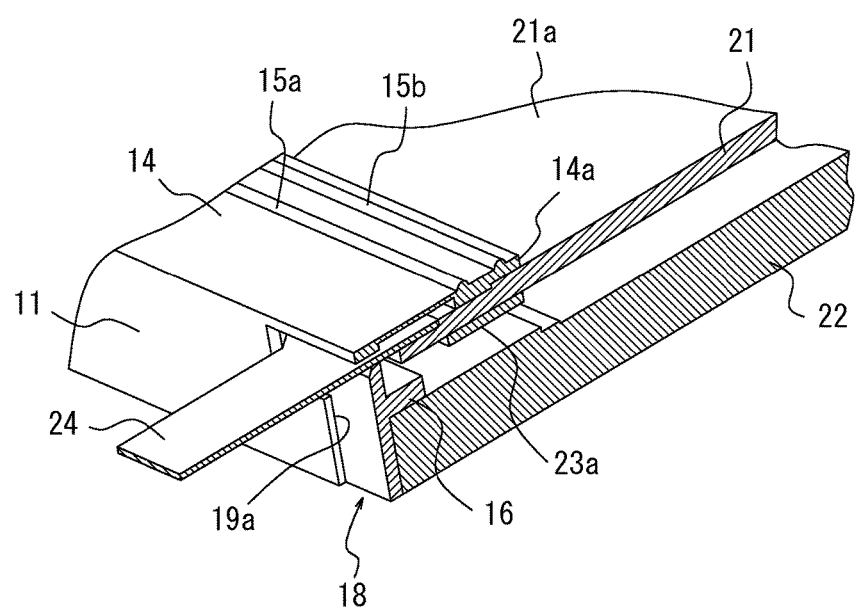
FIG. 5 is an enlarged perspective view taken from line V-V of FIG. 3.
Figure 6:
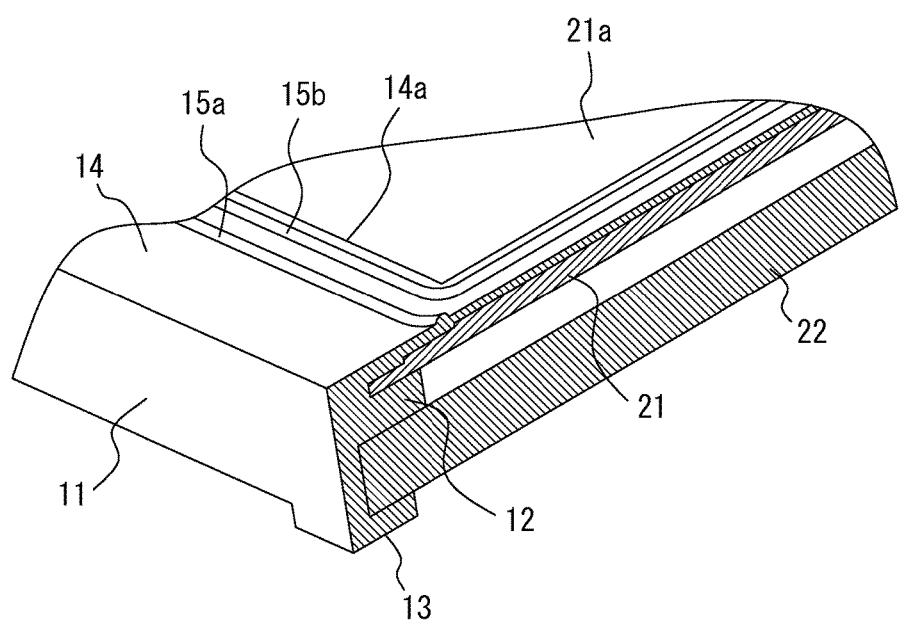
FIG. 6 is an enlarged perspective view taken from line VI-VI of FIG. 3.

FIG. 3 is an external perspective view of the touch panel unit, and FIG. 4 is an external perspective view of the touch sensor and the display panel. FIG. 5 is an enlarged perspective view taken from line V-V of FIG. 3, and FIG. 6 is an enlarged perspective view taken from line VI-VI of FIG. 3. The touch panel unit 20 according to the present embodiment includes the unit frame 10 for touch panel illustrated in FIG. 1 and FIG. 2, the touch sensor 21 and the display panel 22.

The touch sensor 21 has piezoelectric elements 23a, 23b in the strip shape adhered to the rear face thereof at the center of each of two opposing sides along the respective sides outside a display area 22a of the display panel 22. The flexible circuit board 24 is connected to the touch sensor 21 and has a wiring pattern to be connected to the touch sensor 21 and a wiring pattern to be connected to the piezoelectric elements 23a, 23b.

The flexible circuit board 24 passes through the opening 17 formed on the side wall of the frame body 11 from inside to outside the frame body 11. The touch sensor 21 having the piezoelectric elements 23a, 23b adhered thereto is adhered, at four corners on the rear side thereof, to a front face of the support member 12 formed at each corner of the frame body 11, and fixed in a slightly bendable manner in a thickness direction. The piezoelectric elements 23a, 23b, when the touch sensor 21 is mounted on the frame body 11, are positioned inside the frame opening 14a and below the edge member 14 away from the rail member 16.

Accordingly, the touch sensor 21 slightly bends when the touch face 21a on the surface thereof is pressed, and thereby an electric charge is accumulated in the piezoelectric elements 23a, 23b to generate a voltage. The generated voltage is guided outside via the flexible circuit board 24. Also, when the voltage is applied to the piezoelectric elements 23a, 23b from outside via the flexible circuit board, the piezoelectric elements 23a, 23b bend such that the touch sensor 21 is vibrated being supported by the support members 12 at four points. Both edges of the flexible circuit board 24 protruding outward from the frame body 11 are inserted into the grooves 19a, 19b along the guide portion 18 and supported to bend, as necessary.

The display panel 22 has four corners clipped by the support members 12 and the holding members 13 corresponding to each other at four corners of the frame body 11. Thereby, the display panel 22 is mounted having each periphery on a front face thereof contacting the rear face of the support member 12 and each rail member 16. Each of the piezoelectric elements 23a, 23b mounted on the rear face of the touch sensor 21 has a thickness smaller than the height of the support member 12, such that the piezoelectric elements 23a, 23b and the display panel 22 have a space therebetween.

According to the unit frame 10 for touch panel of the present embodiment, as described above, no new component is used in mounting the touch sensor 21 and the display panel 22. Moreover, the touch sensor 21 may be easily positioned and mounted by fixedly adhering the corners on the rear face thereof to the support member 12 formed at each corner of the frame body 11. Also, each corner of the display panel 22 is clipped by the support member 12 and the holding member 13 corresponding to each other at each corner of the frame body 11. Thereby, the display panel 22 may be easily positioned and mounted having the predetermined space from the touch sensor 21. Accordingly, the number of components of the touch panel may be reduced and assembling is simplified, thus productivity of the touch panel may be improved. Further, since the guide portion 18 for guiding the flexible circuit board 24 connected to the piezoelectric elements 23a, 23b and the touch sensor 21 is formed on the unit frame 10 for touch panel, damaging the flexible circuit board 24 due to dragging may be prevented.

It is to be understood that the present invention is not limited to the above embodiment but may be modified or varied in a multiple of manners. For example, the edge member 14, the protruding members 15a, 15b, the rail member 16, the opening 17, the guide portion 18 and the grooves 19a, 19b may be provided as necessary. Also, although the two piezoelectric elements 23a, 23b are provided on the rear face of the touch sensor 21 to vibrate the touch sensor 21 according to the above embodiment, the number of piezoelectric elements is not limited to 2 but may be 1 or greater than 2. Further, the embodiment may be effectively applicable when, without providing the piezoelectric element, the touch sensor is supported over the display panel having a predetermined space therebetween.

REFERENCE SIGNS LIST 10 unit frame for touch panel
11 frame body
12 support member
13 holding member
14 edge member
14a frame opening
14b cutout
15a, 15b protruding member
16 rail member
17 opening
18 guide portion
19a, 19b groove
20 touch panel unit
21 touch sensor
21a touch face
22 display panel
22a display area
23a, 23b piezoelectric element
24 flexible circuit board

The invention claimed is:

1. A unit frame for touch panel, said unit frame configured to support a touch sensor and a display panel, both of which are rectangular in shape, with a predetermined space therebetween, comprising:
   a frame body in the rectangular shape;
   a support member having a height corresponding to the predetermined space and provided at each corner of the frame body, configured to support each corner of a rear face of the touch sensor and to be positioned between the touch sensor and the display panel; and
   a holding member provided at each corner of the frame body on an opposite side to the face where the touch sensor is supported by the support member, configured to clip a corner of the display panel in cooperation with the support member corresponding to the holding member, wherein
   the support member is positioned separately from another support member at another corner, and
   the holding member is positioned separately from another holding member at another corner.

2. The unit frame for touch panel according to claim 1, further comprising:
   an edge member covering a periphery of a surface of the touch sensor; and
   an opening formed on a side wall of the frame body for allowing a flexible circuit board connected to the touch sensor to pass through the opening.

3. The unit frame for touch panel according to claim 2, further comprising:
   a guide portion formed on an external wall of the frame body from the opening along an end face of the frame body having the holding member, configured to guide the flexible circuit board; and
   grooves provided to the guide portion configured to support both edges of the flexible circuit board.

4. A touch panel unit including the unit frame for touch panel, the touch sensor in the rectangular shape and the display panel in the rectangular shape according to claim 1, wherein
   the touch sensor is disposed having a corner on a rear face thereof supported on the support member provided separately at each corner of the frame body, and
   the display panel is disposed having corners clipped by the support member on a face thereof opposite to a face supporting the touch sensor and by the holding member corresponding to the support member.

5. The touch panel unit according to claim 4, further comprising:
   a piezoelectric element mounted on each of two opposing peripheries of the rear face of the touch sensor.

* * * * *